United States Patent
Lutz et al.

(10) Patent No.: US 7,223,512 B2
(45) Date of Patent: May 29, 2007

(54) MULTILAYER BODY WITH A LASER-SENSITIVE LAYER

(75) Inventors: Norbert Lutz, Rückersdorf (DE); Gerhard Zinner, Pyrbaum (DE); Matthias Schumacher, Borchen (DE); Ulrich Knaack, Paderborn (DE); Dirk Fischer, Paderborn (DE)

(73) Assignee: ORGA Systems GmbH, Paderborn (DE)

( * ) Notice: Subject to any disclaimer, the term of this patent is extended or adjusted under 35 U.S.C. 154(b) by 49 days.

(21) Appl. No.: 10/513,840

(22) PCT Filed: May 8, 2002

(86) PCT No.: PCT/DE02/01677

§ 371 (c)(1), (2), (4) Date: Jan. 13, 2005

(87) PCT Pub. No.: WO03/095745

PCT Pub. Date: Nov. 20, 2003

(65) Prior Publication Data

US 2005/0142342 A1   Jun. 30, 2005

(51) Int. Cl.
*G03F 7/00* (2006.01)
*G03F 7/095* (2006.01)

(52) U.S. Cl. .................. 430/200; 430/270.1; 430/944; 430/945; 430/962

(58) Field of Classification Search ............. 430/270.1, 430/944, 945, 200, 962
See application file for complete search history.

(56) References Cited

U.S. PATENT DOCUMENTS

| | | | |
|---|---|---|---|
| 3,897,964 A | 8/1975 | Oka et al. | |
| 4,523,777 A | 6/1985 | Holbein et al. | |
| 5,075,195 A | 12/1991 | Bäbler et al. | |
| 5,234,890 A * | 8/1993 | Burberry et al. | 503/227 |
| 5,240,900 A * | 8/1993 | Burberry | 503/227 |
| 5,289,547 A * | 2/1994 | Ligas et al. | 283/72 |
| 6,143,451 A * | 11/2000 | Blanchet-Fincher | 430/11 |
| 6,154,432 A * | 11/2000 | Faruqi et al. | 369/103 |
| 6,617,094 B2 * | 9/2003 | Ozawa et al. | 430/270.1 |
| 6,747,930 B1 * | 6/2004 | Weldon et al. | 369/53.21 |
| 6,827,283 B2 * | 12/2004 | Kappe et al. | 235/494 |
| 2002/0022112 A1 | 2/2002 | Hoeppner et al. | |

FOREIGN PATENT DOCUMENTS

| | | |
|---|---|---|
| EP | 0 738 609 A1 | 10/1996 |
| EP | 0 637 514 B1 | 10/1997 |
| GB | 1 393 445 | 5/1975 |
| WO | WO 98/19868 | 5/1998 |

* cited by examiner

*Primary Examiner*—Amanda Walke
(74) *Attorney, Agent, or Firm*—Hoffman & Baron, LLP

(57) ABSTRACT

The present invention relates to a process for increasing the level of safeguard in respect of forgery of paper documents. For that purpose, applied to the paper document is a transfer film or laminating film having a laser-sensitive layer. This multi-layer body is then treated with laser radiation. In that case, a laser-induced marking is produced in the laser-sensitive layer, for example, by laser-induced bleaching, laser-induced color change or laser-induced blackening. Respective individualization of the document can be effected by way of that laser-induced marking.

27 Claims, 19 Drawing Sheets

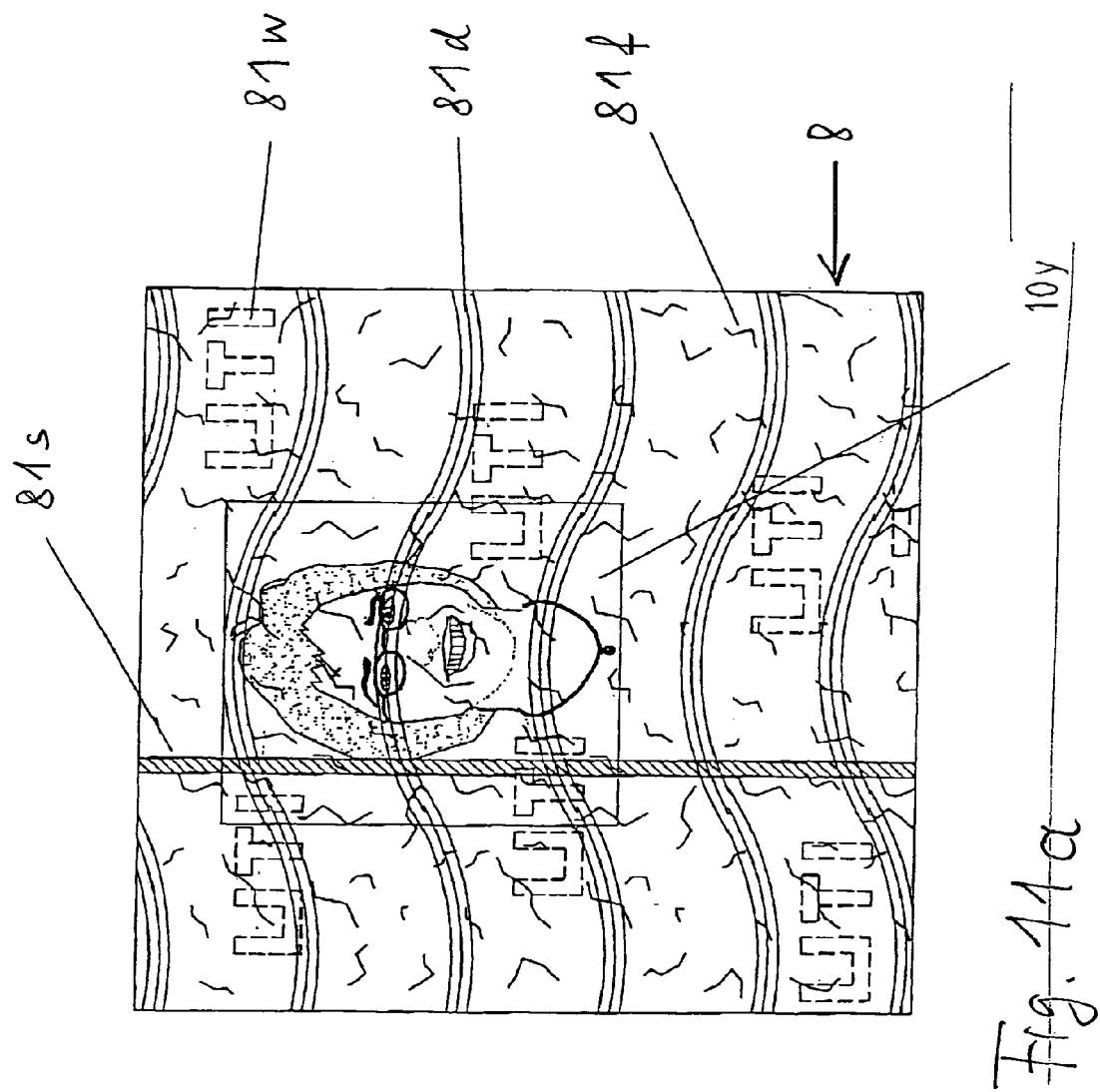

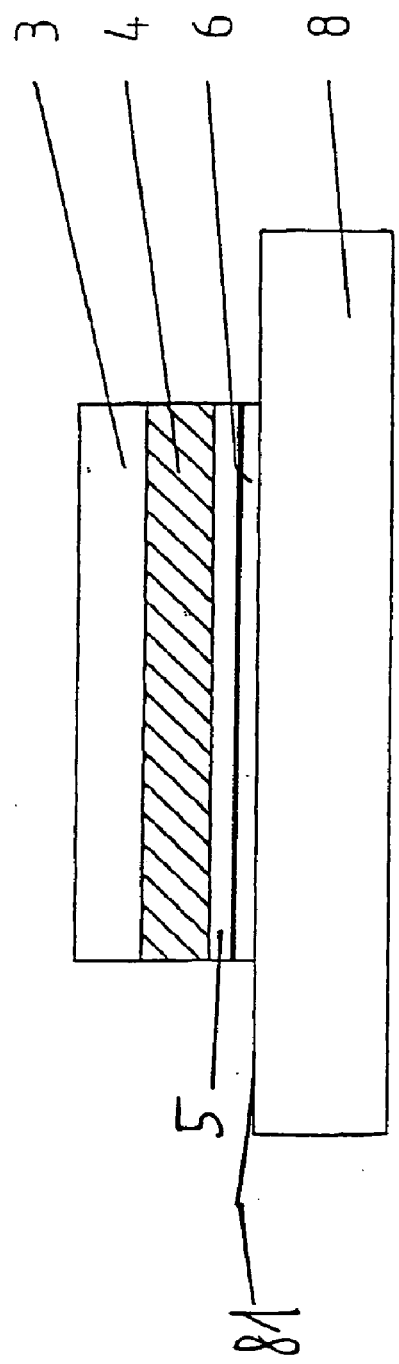

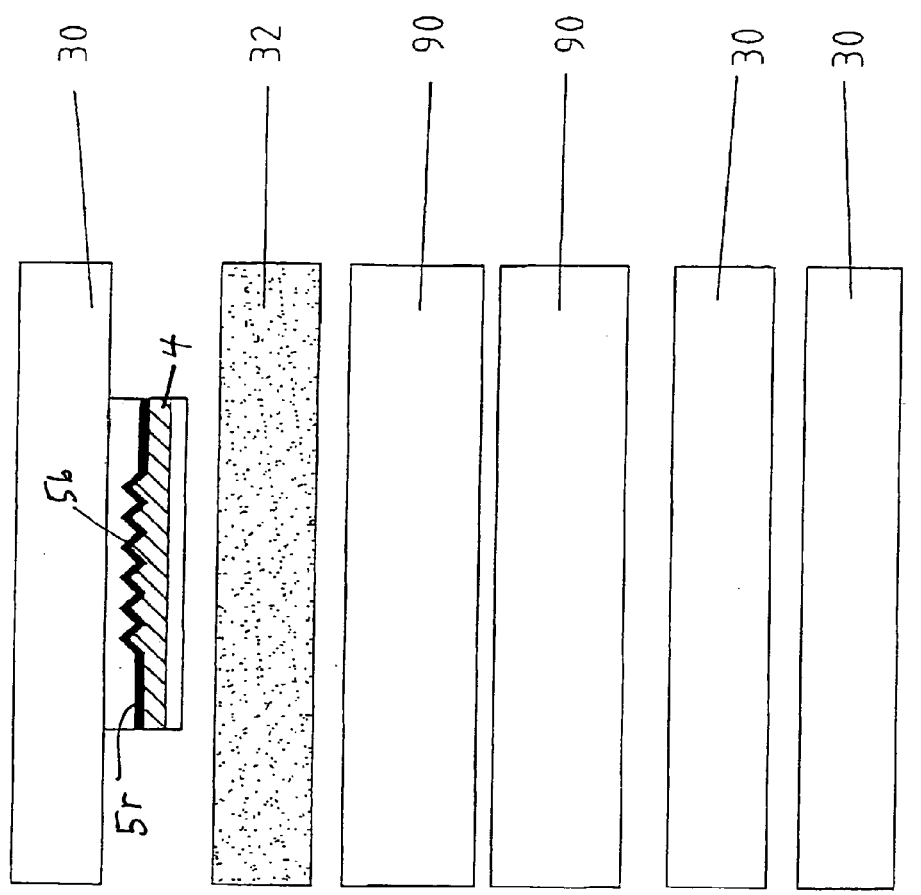

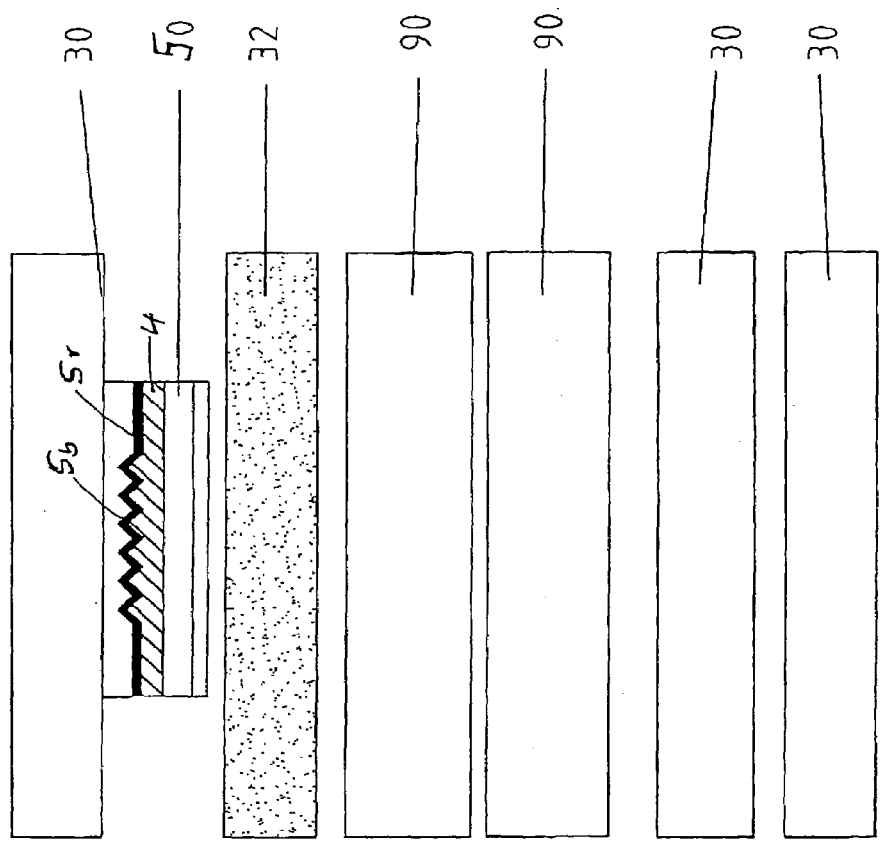

MULTILAYER BODY WITH A LASER-SENSITIVE LAYER

CROSS-REFERENCE TO RELATED APPLICATIONS

This application is a National Phase application of International Application No. PCT/DE02/01677 filed May 8, 2002, which is incorporated herein by reference.

BACKGROUND OF THE INVENTION

The invention concerns a multi-layer body comprising a substrate which at least partially comprises paper material, with a single-layer or multi-layer structure, based on a transfer film, for example a hot stamping film, or based on a laminating film, or based on printing or coating in some other fashion, as well as a process for the production of a laser-induced marking in such a multi-layer body.

The use of laser radiation for producing laser-induced markings for enhancing the level of safeguard against forgery of cards comprising plastic material such as identity cards, code cards and so forth is known. Individualization of such cards or the like can be effected with the laser-induced markings.

Laser treatment for individualization purposes is not used in relation to documents which comprise paper material because paper material burns under the effect of laser radiation.

SUMMARY OF THE INVENTION

The object of the invention is to increase the level of safeguard against forgery of paper documents by the use of laser radiation. In that respect the aim is to achieve a specific structural configuration of the paper document and a particular process for increasing the level of safeguard against forgery.

The invention attains that object with a multi-layer body as set forth in claim 1 and á process as set forth in claim 16.

The solution according to the invention provides that the paper document is in the form of a multi-layer body in which a single-layer or multi-layer film or the like, for example a hot stamping film, is applied to the substrate comprising paper material. The layer structure produced in that way should have at least one layer containing laser-sensitive material. The laser-sensitive material is such that a laser-induced marking, for example in the form of a color marking or in the form of a black marking, is converted by laser action on the film applied to the substrate, in the laser-sensitive layer. Surprisingly, upon laser irradiation, under the effect of the radiation on the film applied to the substrate, the substrate comprising paper material is not damaged, that is to say burning of the paper material which occurs when paper material is irradiated directly under the effect of the laser does not take place.

In preferred embodiments however for the sake of certainty arranged between the laser-sensitive layer and the surface of the substrate there is also a special background layer which reflects the laser radiation used in the laser treatment to a high degree and preferably absorbs the non-reflected component of the laser radiation or at least at any event does not allow it to pass through to the subjacent layers and therefore not to the surface of the substrate. By virtue of its light reflection that protective background layer can additionally also act as a brightening means or color booster in respect of the laser-induced marking produced in the laser-sensitive layer. In preferred embodiments that background layer which has both a protective action and also a brightening and color-boosting action is arranged under the laser-sensitive layer exclusively in the region in which the laser-induced marking is produced.

The background layer can also be transparent in relation to light in the visible spectral range but at the same time non-transparent for laser radiation in a given wavelength range, for example for the wavelength range which is used when producing the laser-induced marking. If a further laser-sensitive layer is arranged under the background layer, it is advantageous if the background layer is transparent in relation to the laser radiation which is used for producing the laser-induced marking in that layer.

In particularly preferred embodiments, it is provided that the laser-sensitive material has at least one coloring agent which is bleachable by the laser action or which changes its color by the laser action with a color change. In this respect the laser-sensitive material can advantageously be in the form of a coloring agent mixture which is composed of a plurality of differing coloring agent components. A multi-color image with a wide variation in the colors which can be produced by a laser-induced procedure is possible with embodiments in which the laser-sensitive material is in the form of a mixture of at least two laser-sensitive components, in respect of which it applies that, under the laser conditions which are specific for one component, the other component is not variable or not substantially variable.

Particularly preferred embodiments are those in which a full-color image can be produced in a laser-induced procedure. It is provided in those embodiments that the laser-sensitive material is a mixture of at least three components, wherein each of those components is respectively a coloring agent, for example a pigment or another coloring agent. The pigments are mostly insoluble, preferably inorganic coloring agents. Other coloring agents are for example organic coloring agents. These are generally soluble. It is possible to use mixtures which as coloring agents have exclusively pigments or exclusively other coloring agents or pigments and other coloring agents. The coloring agents which therefore form the components of the mixture are referred to hereinafter for the sake of brevity as components. It is essential that one or more of the components can be bleached by means of laser under laser conditions which are respectively specific for the component involved. In other words, for bleaching the first component, there is a first laser condition, for example a first specific laser wavelength; for bleaching the second component there is a second laser condition, for example a second specific laser wavelength, and for bleaching the third component there is a third laser condition, for example a third specific laser wavelength. Those specific laser conditions or laser wavelengths used for bleaching the various components are respectively different from each other. They are also so selected that, under the respective specific laser conditions for a component, for example the specific laser wavelength, only that one component or preferably only that one component can be bleached and in that procedure the other components cannot be bleached or substantially cannot be bleached. In that way it is possible for only one respective component to be specifically bleached in a step in the laser treatment, while the others are left unaltered.

If a three-component mixture is used, the color of the marking is therefore formed prior to the first step by the three components. After the laser treatment of the first step the color of the marking at the treated location is formed by the two components which have not been bleached in the laser treatment of the first step and possibly additionally by the residual color of the component which was bleached to a greater or lesser degree in the first step, depending on the respective treatment involved. Preferably, the coloring effect is produced by subtractive mixing of the components which are present mixed in the laser induced layer. The various components can be present in a layer mixed in closely juxtaposed relationship or mixed in a multi-layer mutually superposed relationship.

The process for the production of a multi-color image provides that in a first step only the one component is bleached by laser irradiation of a location of the body, that is the laser-sensitive layer, under laser conditions which are specific for one of the for example (three) components, and that in a second step by laser irradiation at the same location of the body, under laser conditions which are specific for a further one of the (three) components, only that further component is bleached. In the first step therefore, besides the bleached first component, there still remain the other (two) unbleached components, so that the color is accordingly formed by those (two) unbleached components, possibly with an incomplete degree of bleaching of the first component in addition with the residual color of the first component which is only bleached to a greater or lesser degree. After the second step in which the second component is bleached there is still only one component remaining—if a three-component mixture was originally used—so that then therefore the color is formed only by that remaining component. That applies for the situation where the other components have been completely bleached in the preceding steps. Otherwise, that is to say with an incomplete degree of bleaching of the first component in the first step and with an incomplete degree of bleaching of the second component in the second step, the color after the second step is additionally formed by the residual color of the first and second components which were only bleached to a greater or lesser degree in the first and second steps.

In addition, provided as an optional third step is the laser treatment of the same location on the body for the third component, that is to say the component which has not previously been bleached, wherein only that third component is bleached at the same location of the body under laser conditions which are specific for that third component, for example a specific laser wavelength. After that third step therefore at the location in question, all three components have been bleached or have been bleached more or less, according to the respective degree of bleaching. Therefore, depending on a possible colored background layer or also possible further components in the body or in the same layer of the body, the above-mentioned location of the body appears colorless or tinted, and in the limit case it appears white when the background is white.

There are also possible further steps, in each of which one or more respective further components is or are bleached, under specific laser conditions. It is preferably provided that in general, in an n-th step, by laser irradiation of the same location of the body, for another further one of n components, only that n-th component is bleached.

Depending on the respective choice of the components and the specific laser conditions it can also be provided that at least one of the components exhibits a color change in the laser irradiation procedure.

In the laser treatment in the individual steps, it is respectively provided that the color change or degree of bleaching to be achieved is adjusted in the laser irradiation procedure by control of the laser conditions, in particular the laser wavelength, the laser intensity and/or the irradiation time.

The laser conditions used in the respective individual steps are preferably experimentally ascertained and/or optimised before carrying out the process, by way of tests with the individual components. The criterion in regard to the choice of the laser conditions is preferably the bleaching result to be achieved. The choice of the laser conditions which are used in relation to the individual steps can be such that the component absorbs light at the wavelength of the laser light used for the bleaching operation, insofar as the component at that wavelength has an absorption maximum, preferably one of a plurality of absorption maxima, or preferably its sole or its greatest absorption maximum. However the choice can also be such that the component absorbs light at the laser light wavelength used for the bleaching operation, but in that case at that wavelength the component does not have an absorption maximum, but rather that wavelength is outside the absorption maximum or outside the absorption maxima of the component.

In order to be able to operate with a pigment mixture with relatively few pigment components but in that case to be able to produce as many colors as possible and preferably all colors, it is advantageous if a component is a cyan pigment and/or a component is a magenta pigment and/or a component is a yellow pigment. Preferably the pigment mixture contains a cyan pigment, a magenta pigment and a yellow pigment. In particular embodiments the pigment mixture involves a mixture with exclusively three pigment components, preferably cyan pigment, magenta pigment and yellow pigment. All colors can be produced with those three colors by subtractive mixing. By specific bleaching of the individual pigment components in the individual steps, it is possible for example to produce blue in the first step if in that first step only or preferably only the yellow pigment component is bleached, or in the first step it is possible to produce green if in that first step only or preferably only the magenta pigment component is bleached or in the first step it is possible to produce red if in that first step only or preferably only the cyan pigment component is bleached. Then, the color cyan, magenta or yellow can be produced in the second step, insofar as a further one of the remaining pigment components which were not bleached in the first step is bleached, that is to say if blue has been produced in the first step and therefore cyan and magenta have not been bleached in the first step, the color cyan can be produced in the second step by bleaching the magenta component in the second step. Production of the other colors is effected in a corresponding manner, for the following applies in regard to subtractive color mixing:

| | |
|---|---|
| a) cyan + magenta + yellow | black |
| b) cyan + magenta | blue |
| c) cyan + yellow | green |
| d) yellow + magenta | red |

The color mixture a) is present prior to the laser treatment, that is to say prior to the first step. The laser-sensitive layer appears black or gray. The color mixture b) or c) or d) is present after the first step, that is to say at the location at which the laser treatment was effected in the first step the laser-sensitive layer has a blue or a green or a red color marking respectively. After the second step, when thus laser treatment of the second step has been carried out in the second step at the same location, the color marking at that location of the layer is in the color cyan or yellow or magenta, depending on which of the two pigment components which were not bleached at that location in the first step have not been bleached in the second step. In order to obtain a colorless or transparent marking in the third step at that location, the third step is then to be carried out at the same location, in which third step therefore the remaining pigment which has not yet been bleached is now bleached with the respective pigment-specific laser conditions.

In that way a respective color marking of any desired color can be respectively produced at each location by successive laser treatment at that same location. It is possible in that way for mutually juxtaposed locations of the body to be successively treated, thereby to produce a multi-color image, preferably a so-called full-color image, on the plastic body by means of mutually juxtaposed color markings.

Instead of the above-described pigment mixture with the pigment components cyan pigment, magenta pigment and yellow pigment, it is also possible to use a corresponding coloring agent mixture with coloring agents which do not represent pigments, that is to say a coloring agent mixture comprising cyan coloring agent, magenta coloring agent and yellow coloring agent as the components involved. In this respect operation can be implemented in the same manner, the laser conditions which are specific for the respective coloring agent being used in the individual steps.

The various systems preferably use pulsed, frequency-multiplied solid-state lasers, optical parametric oscillators (OPOs) and pulsed UV lasers (for example Excimer lasers) for the laser treatment. In the laser treatment the intensity and/or the pulse duration of the laser radiation is preferably so set that a maximum bleaching result or a maximum color change occurs without perceptible damage to the material of the body. The process can be used on the film applied to the substrate and also on separate films alone; thus for example transfer films, in particular hot stamping films, or on laminating films. The use thereof on transfer or laminating films affords advantages in that those films can also be applied to other substrates which in themselves are very laser-sensitive in order to decorate or identify them. The films require only a small amount of coloring agent or pigment as the coloring agents or pigments then only have to be present in a thin layer. When using films it is also possible for bodies of any size, for example very large-area paper bodies or the like, to be coated-only locally, for example by printing processes.

The laser treatment involves using energy densities of preferably between 0.05 and 0.5 J per $cm^2$ with a pulse duration of between 5 and 20 ns, wherein the bleaching result can also be determined by the number of pulses. The laser-sensitive layer with the pigment mixture can be present on the transfer or laminating foil over the full surface thereof, but also only in region-wise manner.

BRIEF DESCRIPTION OF THE DRAWINGS

Preferred embodiments by way of example are described in greater detail hereinafter with reference to the accompanying Figures in which:

FIGS. 13 through 15 show exploded views of laminated cards comprising various overlay films and inlets comprising paper material.

Figure 1:
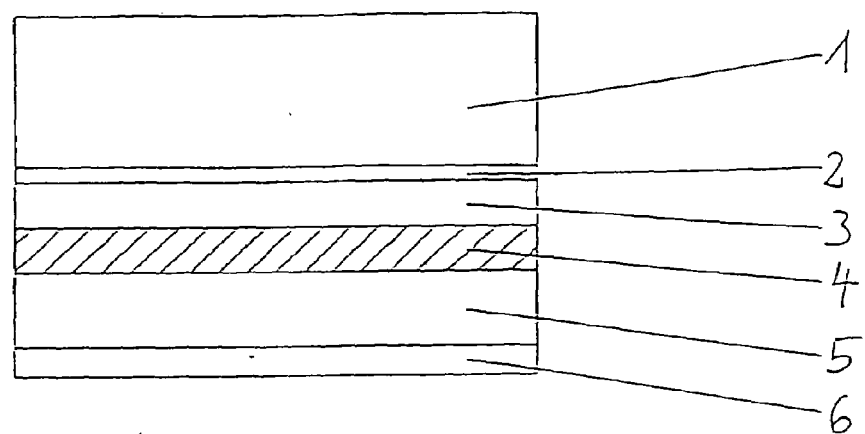
FIGS. 1 through 5 show sectional views of various hot stamping films each with a laser-sensitive layer.

DETAILED DESCRIPTION OF THE INVENTION.

The films shown in FIGS. 1 through 5 are hot stamping films. The hot stamping film in FIG. 1 includes a carrier film 1, a release layer 2, a protective layer 3, a laser-sensitive layer 4, a background layer 5 and an adhesive layer 6.

The carrier film 1 is preferably a polyester film of a thickness of between 6 and 100 μm, preferably a thickness of between 19 and 38 μm. The layers 2 through 6 are arranged in superposed relationship on the carrier film 1. They are applied using per se known processes in production of the hot stamping film.

The release layer 2 is a separation layer. It is preferably in the form of a layer which becomes soft when subjected to the action of heat and which, when the hot stamping film is applied to the substrate, permits release of the other layers from the carrier film 1. The release layer 2 is generally of a thickness of at most 1 μm.

The protective layer 3 is in the form of a protective lacquer layer. This involves a transparent lacquer layer, the purpose of which is to substantially protect the free surface of the article decorated with the hot stamping film from mechanical damage and chemical effects. The thickness of the layer is preferably between 1 and 2 μm.

The laser-sensitive layer 4 is in the form of the so-called first color lacquer layer. This involves a lacquer layer of a thickness of preferably between 3 and 10 μm, which is colored by pigments or other coloring agents. The pigments or the other coloring systems or coloring agents of this color lacquer layer can be selectively bleached and/or can be changed in color by color change by means of a laser beam whose wavelength is preferably in the visible range. Preferably the pigment concentration of the lacquer layer 4 is between 3 and 15% with respect to solids. The binding agent system of that lacquer layer 4 may not be altered optically by the action of the laser so that, at the irradiated locations, the result is only a colored contrast marking without perceptible damage to the film. The film is not perceptibly damaged either at the surface or in the interior.

The background layer 5 is in the form of the so-called second color lacquer layer. This layer is colored differently from the laser-sensitive layer 4. The layer 5 is for example white or of an ivory color if the laser-sensitive layer 4 is black or gray. The layer 5 serves primarily as a light backup layer for the colors produced in the laser-sensitive layer 4 by laser radiation. The thickness of the layer 5 is preferably between 5 and 20 μm or 15 and 20 μm.

It is possible that the background layer 5—just like the laser-sensitive layer 4—is not provided over the entire surface area of the hot stamping foil and thus not over the entire surface to be decorated, in the same coloration. On the contrary the layers 4 and 5 can be composed individually—and thus also differently—of regions of different colors.

The adhesive layer 6 involves an adhesive layer which is per se usual and known in relation to transfer films, of a thickness of between about 1 and 10 μm, wherein the adhesive layer for a hot stamping film is of such a composition that it becomes sticky only when subjected to the corresponding action of heat.

The layers 2 through 6 can be produced in accordance with the following compositions:

| Release layer 2 (separation layer): | |
| --- | --- |
| Toluene | 99.5 parts |
| Ester wax (dropping point 90° C.) | 0.5 part |
| Protective layer 3 (protective lacquer layer): | |
| Methylethylketone | 61.0 parts |
| Diacetone alcohol | 9.0 parts |
| Methylmethacrylate (Tg = 122° C.) | 18.0 parts |
| Polyethylene dispersion (23% in xylene) (softening point 140° C.) | 7.5 parts |
| High-molecular dispersing additive (40%, amino number 20) | 0.5 part |
| Extender (aluminum silicate) | 4.0 parts |
| Laser-sensitive layer 4 (first color lacquer layer): | |
| Methylethylketone | 34.0 parts |
| Toluene | 26.0 parts |
| Ethylacetate | 13.0 parts |
| Cellulose nitrate (low viscosity, 65% in alcohol) | 20.0 parts |
| Linear polyurethane (m.p. > 200° C.) | 3.5 parts |
| High-molecular dispersing additive (40%, amino number 20) | 2.0 parts |
| e.g.: Pigment Blue 15:4 | 0.5 part |
| Pigment Red 57:1 | 0.5 part |
| Pigment Yellow 155 | 0.5 part |
| Background layer 5 (second color lacquer layer): | |
| Methylethylketone | 40.0 parts |
| Toluene | 22.0 parts |
| Ethylene vinylacetate terpolymer (m.p. = 60° C.) | 2.5 parts |
| Polyvinylchloride (Tg: 89° C.) | 5.5 parts |
| Polyvinylchloride (Tg: 40° C.) | 3.0 parts |
| Dispersing additive (50%, acid number 51) | 1.0 part |
| Titanium dioxide (d = 3.8–4.2 g/cm$^3$) | 26.0 parts |
| Adhesive layer 6: | |
| Methylethylketone | 55 parts |
| Toluene | 12.5 parts |
| Ethanol | 3.5 parts |
| Polyvinylacetate (softening point: 80° C.) | 6.0 parts |
| Butyl/methylmethacrylate (Tg: 80° C.) | 8.0 parts |
| Ethylmethacrylate resin (Tg: 63° C.) | 3.0 parts |
| Methacrylate copolymer (Tg: 80° C.) | 5.0 parts |
| Unsaturated polyester resin (softening point 103° C.) | 3.5 parts |
| Silicon dioxide | 3.5 parts |

Instead of that hot stamping film it is also possible to use another transfer film. It can be of a corresponding structure to the described hot stamping film.

Transfer films—in the specific case here hot stamping films—are preferably applied in a conventional manner to a substrate consisting of paper material, for example one or more inlet films of laminated bodies, and more specifically in such a way that the adhesive layer 6 faces towards the substrate surface. In the hot stamping operation the adhesive layer 6 then forms an adhesive bond to the surface of the substrate. The carrier film 1 is then pulled off—after softening of the release layer 2 under the effect of heat in the hot stamping operation. With the hot stamping film applied to the surface of the substrate in that way the protective layer 3 then forms the upper surface of the stamping film, which is remote from the substrate.

Figure 1A:
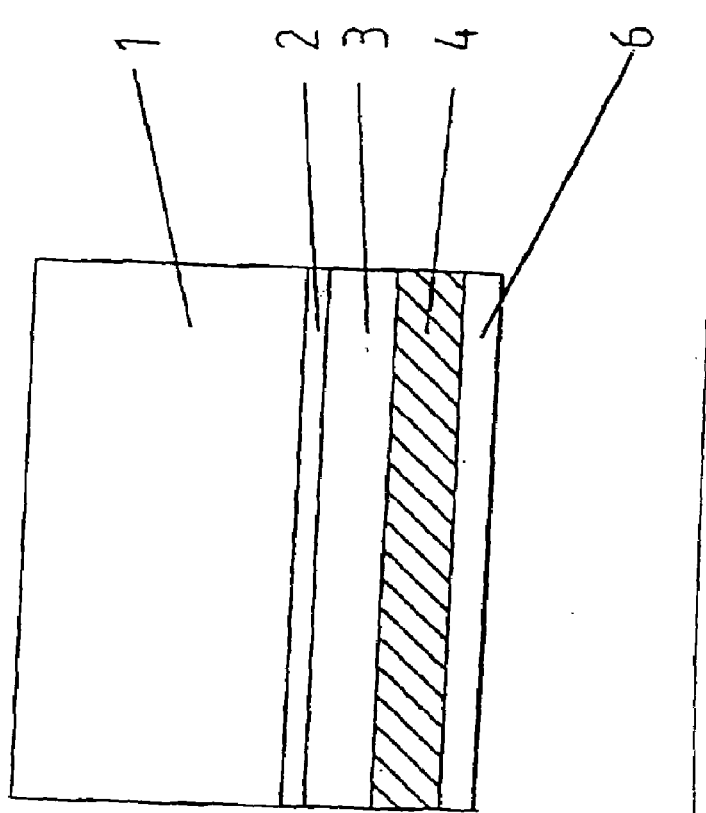

The transfer film shown in FIG. 1a which in particular can be in the form of a hot stamping film does not have a background layer 5, unlike the film in FIG. 1.

Figure 2:
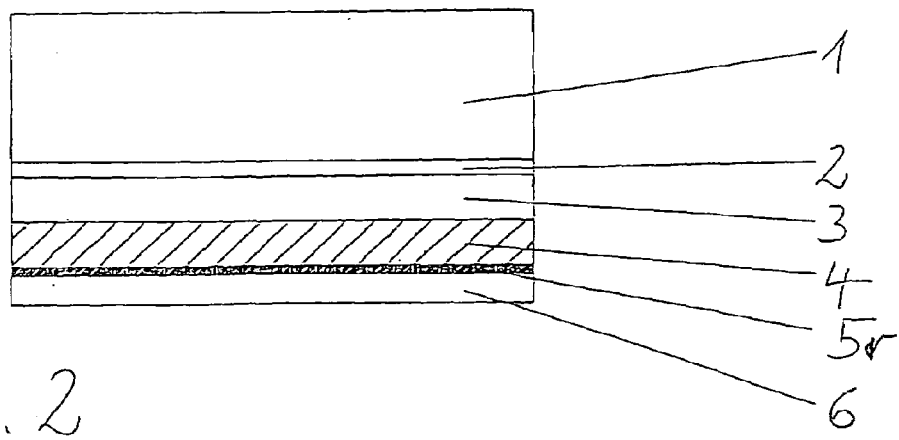
Figure 3:
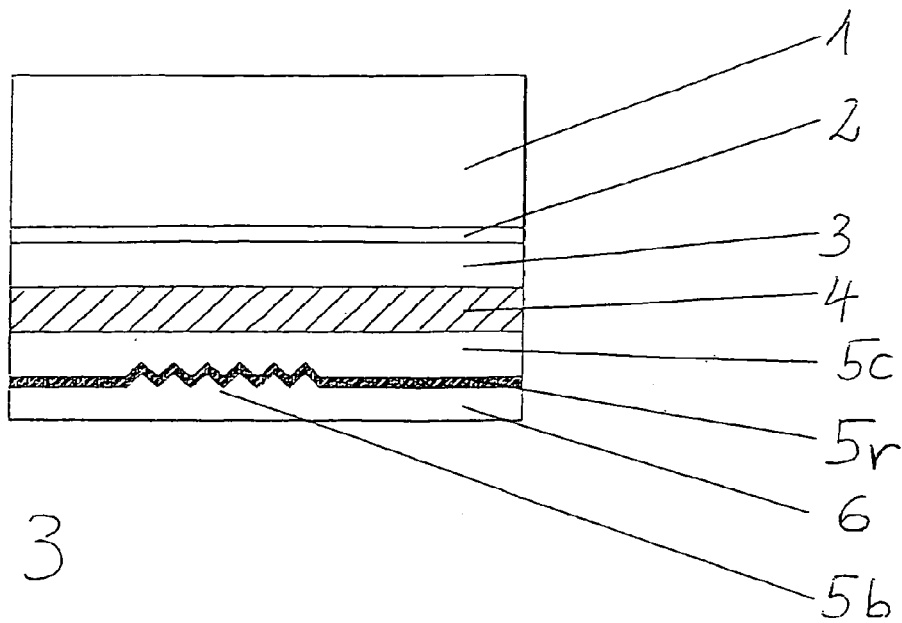
Figure 4:
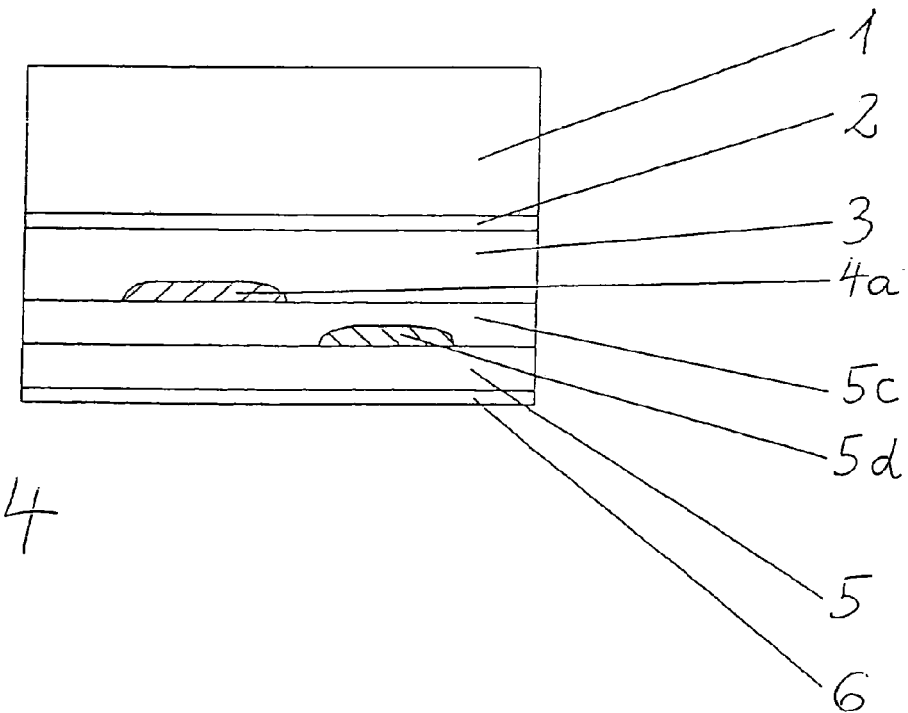

The hot stamping films shown in FIGS. 2 through 4 have a background layer which is of a different nature from the film shown in FIG. 1. In the example shown in FIG. 2 the background layer is in the form of a reflection layer 5r. In a special case the reflection layer is in the form of a metallic reflection layer. The reflection layer can be transparent or partially transparent for given spectral ranges. It can have a higher refractive index than the other layers and therefore has increased reflection of light. The example shown in FIG. 3 has a layer 5c as an additional lacquer layer which is preferably transparent. There is also a reflection layer 5r which has a diffraction or hologram structure 5b in region-wise manner. In the embodiment of FIG. 3 that structure 5b is in the form of a constituent of the lacquer layer 5c and the adhesive layer 6 as well as the interposed layer. Alternatively or in addition a diffraction structure can also be provided as a constituent of the lacquer layer 5c and/or the laser-sensitive color lacquer layer 4 and/or the adhesive layer 6. In these cases the diffraction structure can be of a region-wise nature, as illustrated, but it can also be in the form of a continuous layer.

In the example shown in FIG. 4 a printed image 5d is arranged in the background layer 5c in a defined region and a defined laser-sensitive region 4a is arranged in laterally displaced relationship with the image in the laser-sensitive layer.

Figure 5:
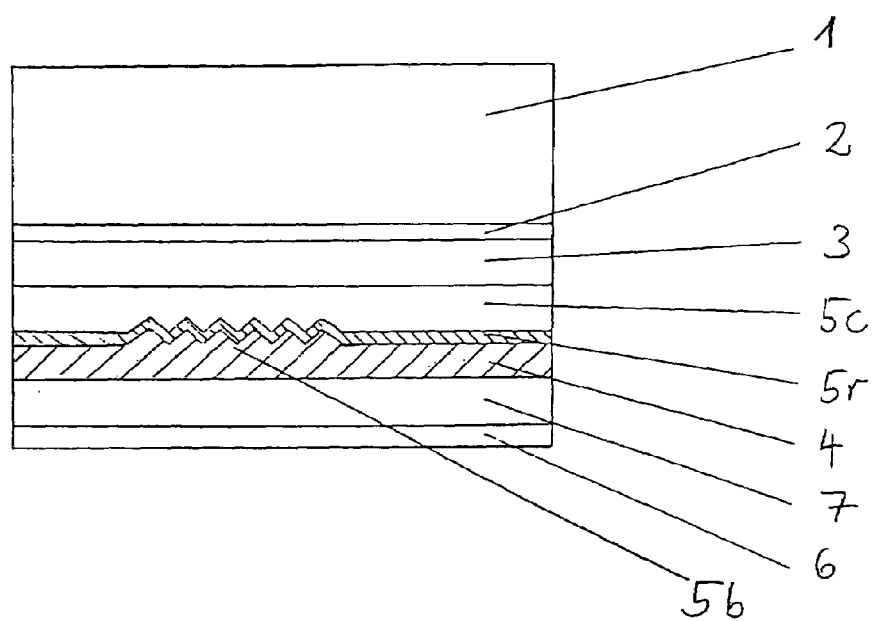

FIG. 5 shows a hot stamping film with a modified layer structure. The layer structure is similar to that in FIG. 3, but in this case the sequence of the layers is modified, more specifically in such a way that the laser-sensitive layer 4 is arranged on the side of the reflection layer 5, which is towards the substrate. The layers are disposed on each other in the following sequence:

A carrier film 1, a release layer 2, a protective layer 3, an intermediate layer 5c, a reflection layer 5, a laser-sensitive layer 4, a background layer 7 and an adhesive layer 6. A diffraction structure 5b is provided in the mutually adjoining regions of the laser-sensitive layer 4, the reflection layer 5 and the intermediate layer 5c. It can be in the form of a diffraction grating. Alternatively the structure 5b can also be in the form of a hologram structure. In the embodiment illustrated by way of example in FIG. 5 the diffraction structure 5b is produced in manufacture of the film, by a procedure whereby the diffraction structure is firstly impressed into the intermediate layer 5c, and then the reflection layer 5r is applied for example by vapor deposition. The reflection layer 5 is in the form of a smooth reflection layer 5r in the portions outside the diffraction structure. It is preferably of a layer thickness of <1 μm. It is transparent or partially transparent at least for given spectral ranges, at given viewing angles. After application of the reflection layer 5r the laser-sensitive layer 4 is produced. The diffraction structure 5b produced in that way is formed in the directly mutually adjoining regions of the layers 5c and 4. When the diffraction structure is viewed varying optical effects are produced in dependence on the lighting and viewing angles.

In the case of the film in FIG. 5a the layers occur in the following sequence: carrier layer 1, release layer 2, protective layer 3, laser-sensitive layer 4, reflection layer 5r, laser-sensitive layer 4, additional lacquer layer 7 and adhesive layer 6. The laser-sensitive layers 4 which are disposed on both sides of the reflection layer 5r can be identical, that is to say the reflection layer is then arranged in that laser-sensitive overall layer. The laser-sensitive layers however may also be different. A diffraction structure 5b is provided in mutually adjoining regions of the laser-sensitive layers 4 and the reflection layer 5r. Alternatively the structure 5b may also be in the form of a hologram structure. In this embodiment, enhanced safeguards against forgery are afforded by the fact that two laser-sensitive layers adjoin the diffraction or hologram structure, and they can be the same or different. In this arrangement the lacquer layer 7 which is optional is in the form of a transparent layer or a bright backup layer. Alternatively the lacquer layer 7 and the adhesive layer 6 may also be omitted and the second laser-sensitive layer 4 shown in FIG. 5a under the reflection layer 5r may be in the form of a laser-sensitive adhesive layer.

In the case of the film in FIG. 5b the layers occur in the following sequence: carrier film 1, release layer 2, laser-sensitive layer 4, additional lacquer layer 5c, reflection layer 5r and adhesive layer 6. The layers 5c and 6 can be of identical material or of different materials. In this embodiment the laser-sensitive layer 4 is a protective lacquer layer which is laser-sensitive insofar as it contains the appropriate comparable pigments. A diffraction structure is formed in the mutually adjoining regions of the additional lacquer layer 5c, the reflection layer 5r and the adhesive layer 6. The diffraction structure can be in the form of a diffraction grating. Alternatively the structure 5b may also be in the form of a hologram structure.

After the transfer film, in the present case a stamping film, has been applied to the substrate, the laser treatment is effected to produce transparent and/or colored markings in the laser-sensitive layer 4. In order to produce a given marking, preferably color marking, at a given position in the laser-sensitive layer 4, that location is irradiated with laser radiation.

In the case of the laser treatment of a film having the layer structure shown in FIG. 5 laser irradiation is effected through the reflection layer inclusive of the diffractive structure 5b. The laser beam is preferably directed perpendicularly on to the plane of the film from above. The reflection layer 5r is transmissive in respect of the laser radiation, in particular when it is directed perpendicularly thereonto. The grating or hologram structure 5b of the layer forming the reflection layer 5r in the rest of the region is transmissive of the laser radiation, but in this respect the radiation can also be reflected more or less and in part at the diffraction structure. The laser-sensitive layer 4 which is arranged under the layer forming the reflection layer 5r in the rest of the region still within the diffraction structure 5b and therebeneath is altered by the effect of the laser insofar as a change in color is produced by bleaching at the given location.

The bleaching operation as takes place in the illustrated embodiments in the respective laser-sensitive layer is described hereinafter.

The laser-sensitive material of the laser-sensitive layer is a mixture of three components, namely a cyan pigment component, a magenta pigment component and a yellow pigment component.

In the bleaching procedure, a blue or green or red color marking is produced in a first step, insofar as that location is irradiated with a given laser wavelength with which a given pigment component is bleached.

In order to produce the color blue only the yellow pigment component may be bleached. Blue laser light is used for that purpose. A given minimum intensity is required for the bleaching operation. In addition a certain pulse duration may not be exceeded. In order to obtain a green color marking in the first step only the magenta pigment component may be bleached. Green laser light is used for that purpose. In order to obtain a red marking in the first step only the cyan pigment component may be bleached. Red laser light is used for that purpose.

In order to produce a color marking of the color cyan or magenta or yellow at that location, that location is subjected to laser treatment in a second step, more specifically with a laser wavelength with which one of the pigment components which is not yet bleached at that location is bleached. If a blue color marking has been produced in the first step, the cyan pigment component and the magenta pigment component are unbleached at that location. In order to produce the color cyan at that location the magenta pigment component must be bleached in this second step. That is effected with green laser light. That therefore produces a cyan-colored marking at that location.

If a magenta-colored marking is to be obtained in that second step instead of the cyan-colored marking, the blue color marking produced in the first step must be treated with red laser light. That causes the cyan pigment to be bleached at that location so that therefore the magenta pigment remains unbleached at that location. That therefore gives the magenta-colored marking at that location.

In a corresponding manner, a cyan-colored marking or a yellow-colored marking may be produced from a green color marking which was produced in the first step and which is formed from unbleached cyan pigment and yellow pigment that has remained there, that operation being effected more specifically by treatment with blue laser light and red laser light respectively.

In a corresponding manner, a red color marking produced in the first step can be converted in the second step into a yellow or magenta-colored marking, more specifically by laser treatment in the second step with green laser light and blue laser light respectively.

In order to produce, at the location treated in the first and second steps, a transparent location, that is to say a white location if the background layer 5 is white, that location must be treated, in a third step with a laser beam whose wavelength is so set that the pigment component which has remained unbleached at that location after the second step is bleached, that is to say the yellow color marking must be bleached with blue light, the magenta-colored marking with green light and the cyan-colored marking with red laser light.

In the same manner, further adjacent locations are then treated in the laser-sensitive layer 4 in order to produce further color markings in the layer 4 of the stamping film. A full-color image can be produced in that way.

Laser treatment can also be used to produce color markings or a full-color image in the coloring agent or agents in the laser-sensitive layer by a color change. The laser treatment can be effected in a corresponding manner with successive process steps. Pigments fall to be considered as the coloring agents, that is to say color-imparting substances. They are mostly insoluble and they generally involve inorganic substances. However mostly soluble, organic coloring agents are considered as the coloring agents. The color change is effected in each case under specific laser conditions which are then applied in the individual steps in the laser treatment.

The laser treatment of the transfer film for producing the color markings can also alternatively be effected prior to application of the film, more specifically in particular if the protective layer 3 is in the form of a layer which is not or is only partially transparent for laser radiation or a layer which is not transparent for laser radiation in the given wavelength range, or if there is provided an additional UV-absorbent protective layer. The laser treatment is then effected prior to application of the film by a procedure whereby the laser beam is directed on to the rear side of the film, that is to say on to the background layer 5 or the adhesive layer 6, and thus the laser-sensitive layer 4 is therefore treated from the other side in order to produce the color markings therein in the same manner. The background layer 5 and the adhesive layer 6 are transparent or at least partly transparent for the laser radiation in question, in relation to such uses.

Color markings can also be produced in laminating films in a corresponding manner. Such laminating films are shown in FIGS. 6 through 10. The laminating film in FIG. 6 includes a so-called overlay film 30, an optional intermediate layer 31, a laser-sensitive layer 40, an intermediate layer 50 which forms a background layer and which is also optional, and an adhesive layer 60 which is also optional. In the laminating operation the laminating film is applied to the substrate with the adhesive layer 60 towards the surface of the substrate. An adhesive bond to the surface of the substrate is produced by way of the adhesive layer 60. The overlay film 30 then forms the upper protective layer whose surface that is remote from the substrate forms the outer surface of the film. The overlay film 30 therefore remains applied there after application of the laminating film. It corresponds to the protective layer 3 of the stamping film in FIG. 1. The laser-sensitive layer 40 corresponds to the laser-sensitive layer 4, that is to say the first lacquer layer 4 of the stamping film in FIG. 1. The intermediate layer 50 corresponds to the background layer 5, that is to say the second lacquer layer 5 of the stamping film in FIG. 1. The adhesive layer 60 corresponds to the adhesive layer 6 of the stamping film in FIG. 1.

Figure 6:
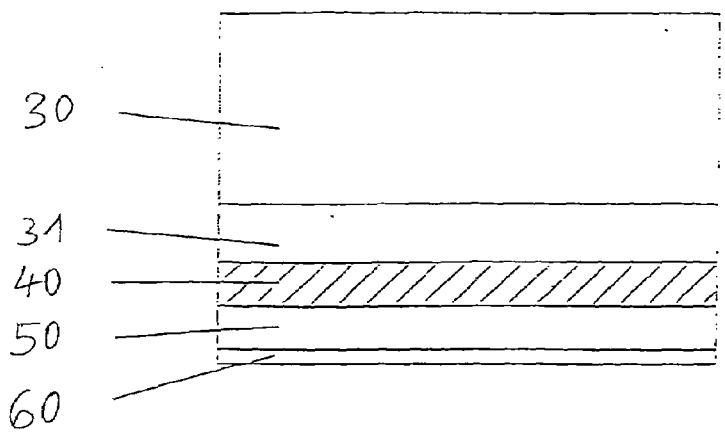
FIGS. 6 through 10 show sectional views of various laminating films each with a laser-sensitive layer, FIGS. 11*a*+11*b* show a plan view and a sectional view of an embodiment of a multi-layer body comprising a substrate formed from paper material with a transfer film applied thereto with a laser-sensitive layer, FIGS. 12*a*+12*b* show a plan view and a sectional view corresponding to FIGS. 11*a* and 11*b* of a modified embodiment.

The laminating film in FIG. 6a represents a modification of the laminating film in FIG. 6, in which the background layer 50 corresponding to the background layer 5 is missing, as in the hot stamping film in FIG. 1c.

Figure 7:
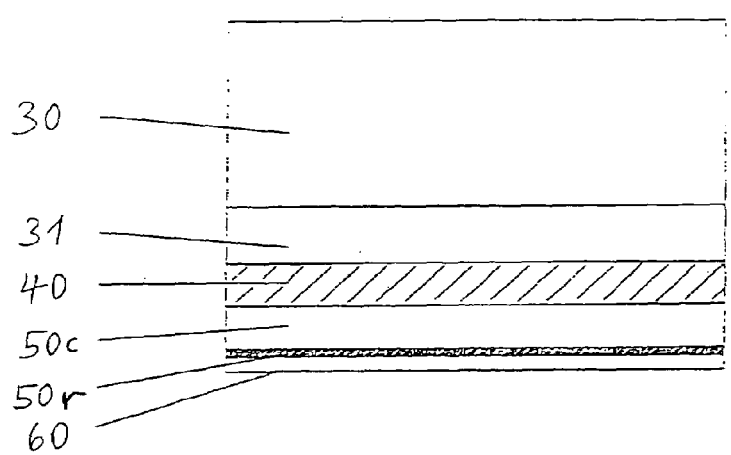
Figure 8:
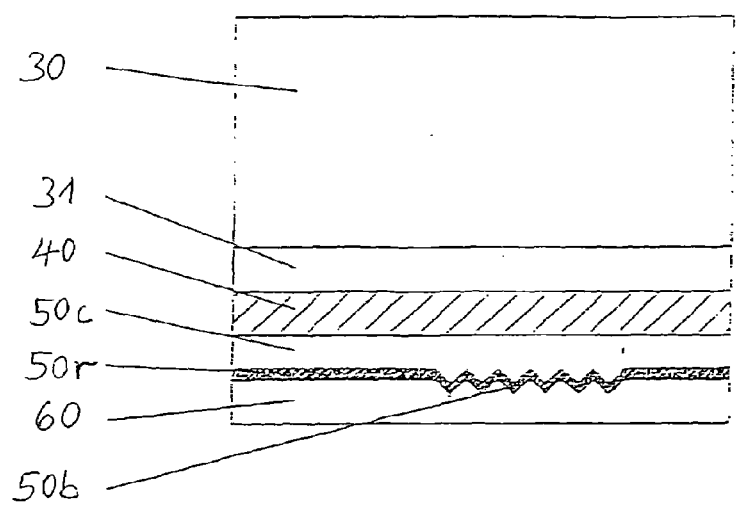

The laminating films in FIGS. 7 and 8 represent modifications of the laminating film in FIG. 6, in which the background layer is modified in a corresponding manner to the background layer in the hot stamping films in FIGS. 2 and 3.

Figure 9:
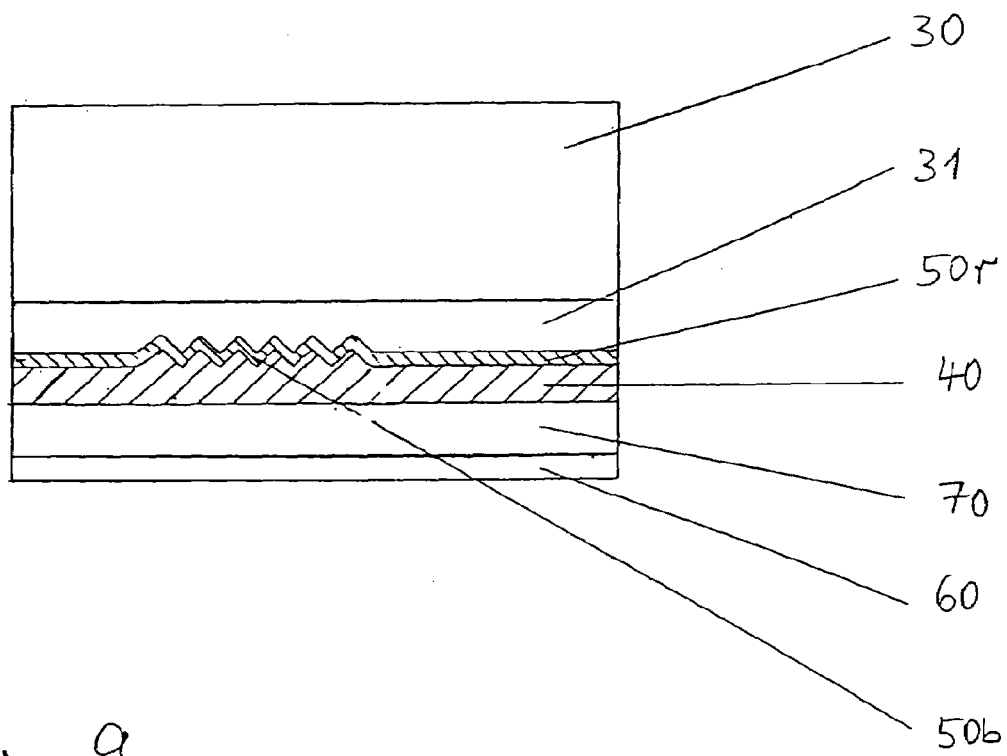

The laminating film in FIG. 9 involves a layer structure with a sequence of the mutually superposed layers, which is modified in relation to FIGS. 6 through 8. The sequence of the layers corresponds to the structure of the hot stamping film in FIG. 5. In this case the layer 70 is an optional background layer.

Figure 5A:
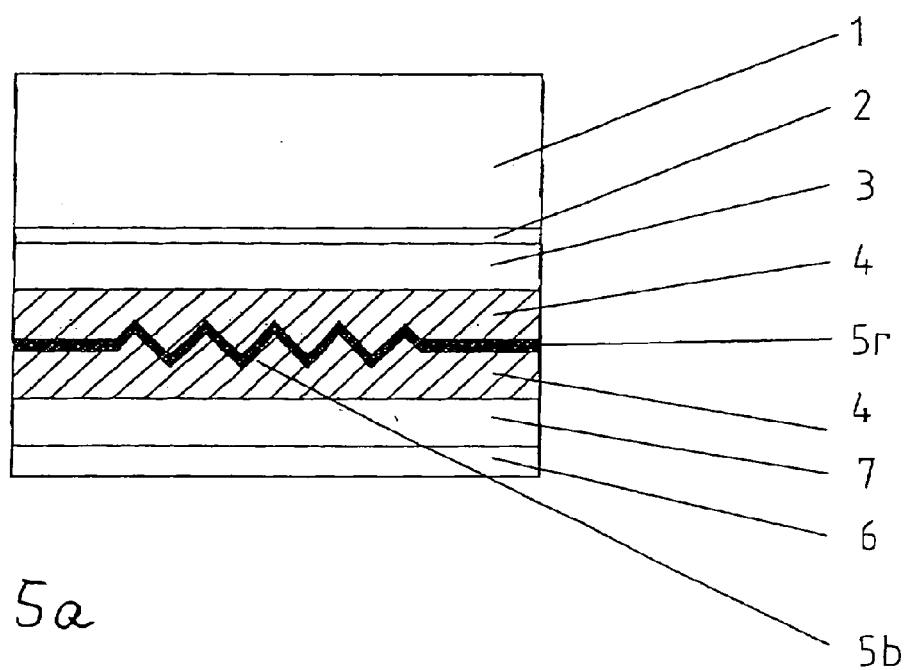
Figure 5B:
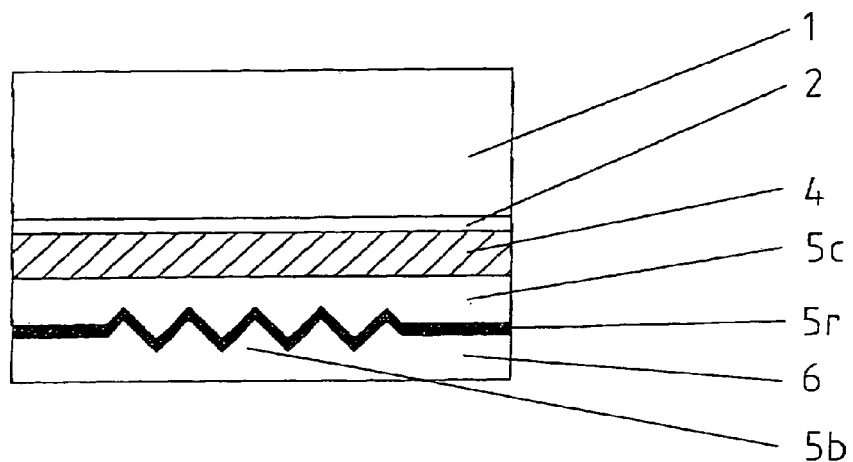
Figure 9A:
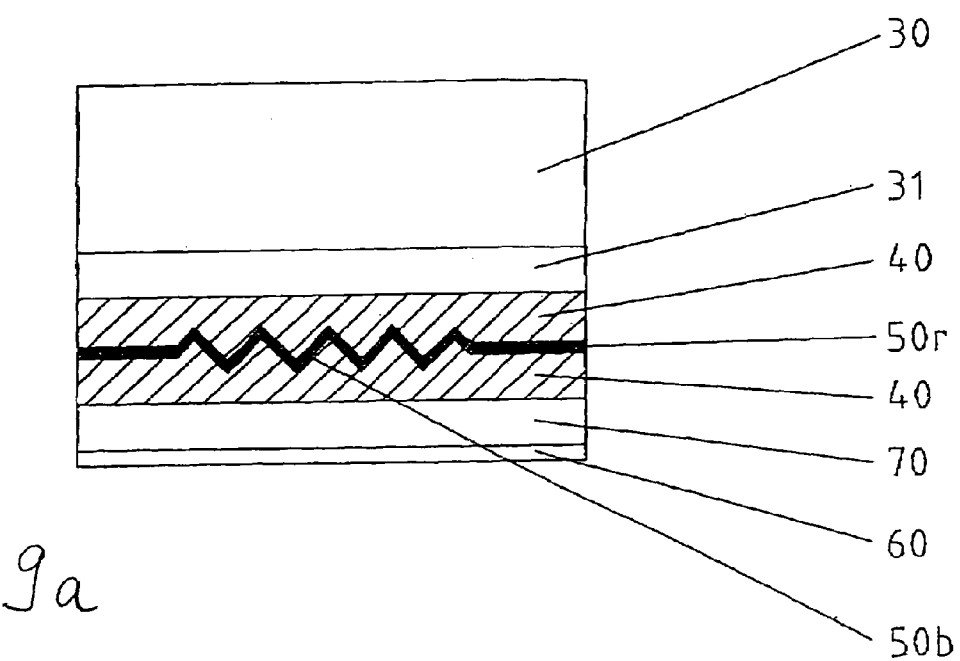

FIG. 9a shows an embodiment which is modified in comparison with the embodiment in FIG. 9, with a sequence of the layers corresponding to the structure of the hot stamping film in FIG. 5a.

Figure 10:
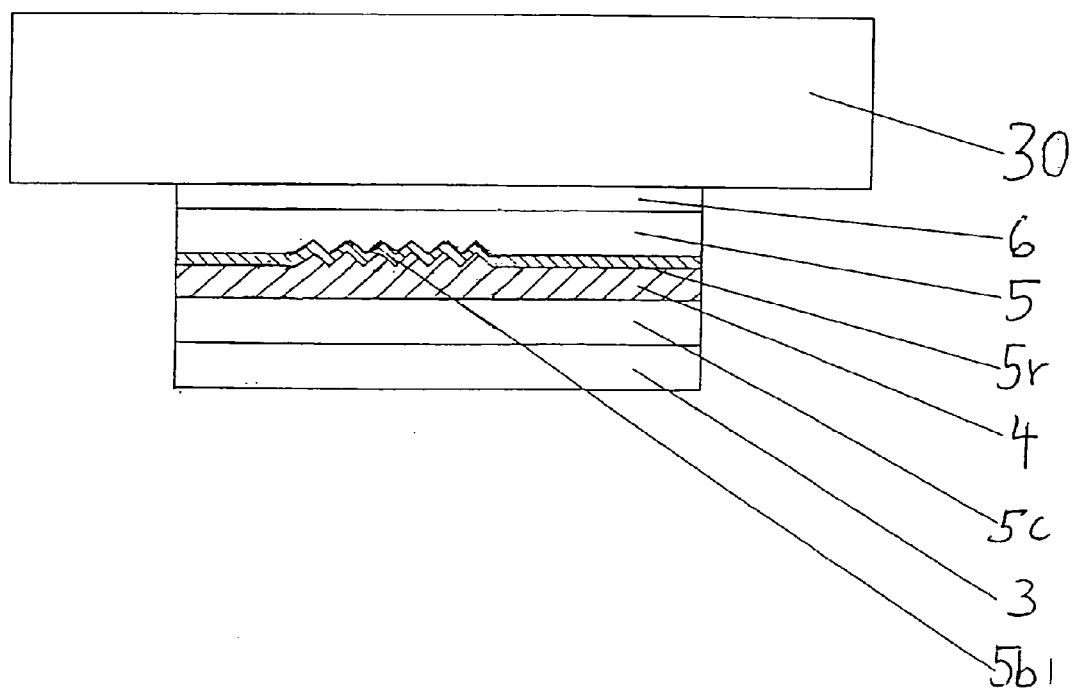

The laminating film in FIG. 10 represents a modification of the laminating film in FIG. 9. In this embodiment the overlay film 30 is provided with a hot stamping film applied thereto. That hot stamping film applied at that location replaces the layers 31, 50 and 50r, 40, 70 and 60 which are provided in the laminating film in FIG. 9, by the corresponding layers of the hot stamping film. In the case of the hot stamping film used for production of that laminating film, unlike the stamping film in FIG. 5, the reflection layer 5r and the laser-sensitive layer 4 are arranged in the reverse sequence so that, in the case of the laminating film in FIG. 10, the reflection layer 5r is now arranged on the side of the laser-sensitive layer 4, which is remote from the substrate, in a corresponding manner to the laminating film in FIG. 9. In the same manner as in the other illustrated embodiments the diffraction structure 5b in the laminating film in FIG. 10 is also provided in the mutually adjoining regions of the layers 4 and 5. In this arrangement the lacquer layer 5 is in the form of a transparent layer.

Figure 10A:
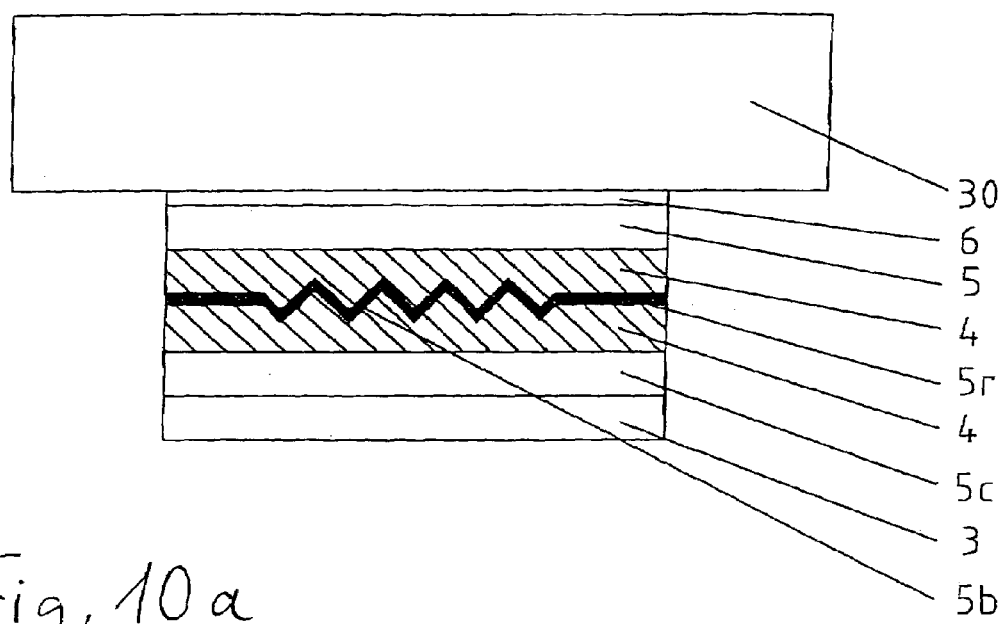

The laminating film in FIG. 10a is of a similar structure to the laminating film in FIG. 10. In the embodiment in FIG. 10a however the overlay film 30 is provided with a hot stamping film applied thereto, which is of a similar structure to the hot stamping film of the embodiment in FIG. 5a. That hot stamping film which is applied to the overlay film 30 replaces the layers 31, 40, 50, 50r, 40, 70 and 60 which are provided in the laminating film in FIG. 9a, by the corresponding layers of the hot stamping film. The laminating film in FIG. 10a involves a series of layers in the following sequence: overlay film 30, adhesive layer 6, optional lacquer layer 5, laser-sensitive layer 4, reflection layer 5r, laser-sensitive layer 4, additional lacquer layer 5c and protective layer 3. The laser-sensitive layers 4 on both sides of the reflection layer 5r can be identical, that is to say the reflection layer 5r is then arranged in that laser-sensitive overall layer. The laser-sensitive layers 4 however may also be different. In that case the lacquer layer 5 is in the form of a transparent layer or a bright backup layer.

Figure 10B:
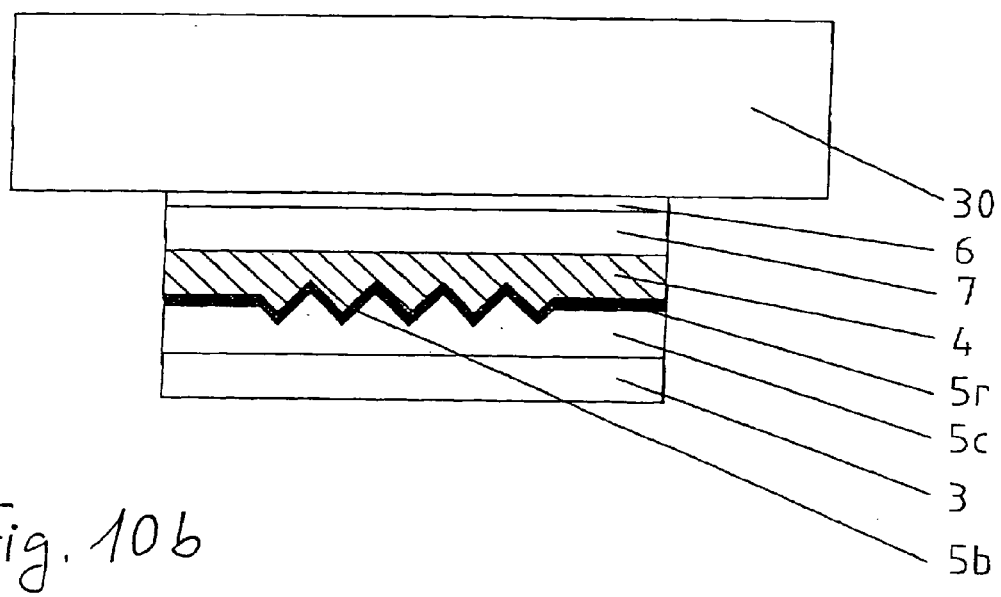

The laminating film in FIG. 10b represents an embodiment in which a hot stamping film is also applied on the overlay film 30. That applied hot stamping film is of a similar configuration to the film in FIG. 5. It replaces the layers 31, 40, 50 and 50r, 40, 70 and 60 respectively provided in the laminating film in FIG. 9a by the layers of the hot stamping film. The laminating film in FIG. 10b has a series of layers involving the following sequence: overlay film 30, adhesive layer 6, optional lacquer layer 7, laser-sensitive layer 4, reflection layer 5r, additional lacquer layer 5c and protective layer 3. In this case the lacquer layer 7 is in the form of a transparent layer or a bright backup layer.

The laser treatment of the laminating foil is implemented in a corresponding manner to that described for the transfer film, that is to say by appropriate successive bleaching of the pigments or other coloring agents contained in the laser-sensitive layer 40 or by corresponding color changes of the pigments or other coloring agents.

The transfer films and laminating films with a film structure as are described hereinbefore with reference to FIGS. 1 through 10 are applied to a substrate comprising paper material with the described application procedure. The substrate can preferably involve a card body which is laminated from a plurality of inlets, wherein the inlets at least partly comprise paper material. Application of the films results in that case in respective multi-layer bodies which each have at least one laser-sensitive layer 4 or 40 respectively. Color markings can be produced in the laser-sensitive layer by the above-described laser treatment. Embodiments by way of example of such multi-layer bodies with laser-induced color markings are described hereinafter with respect to FIGS. 11a, 11b and 12a, 12b.

Figure 11B:
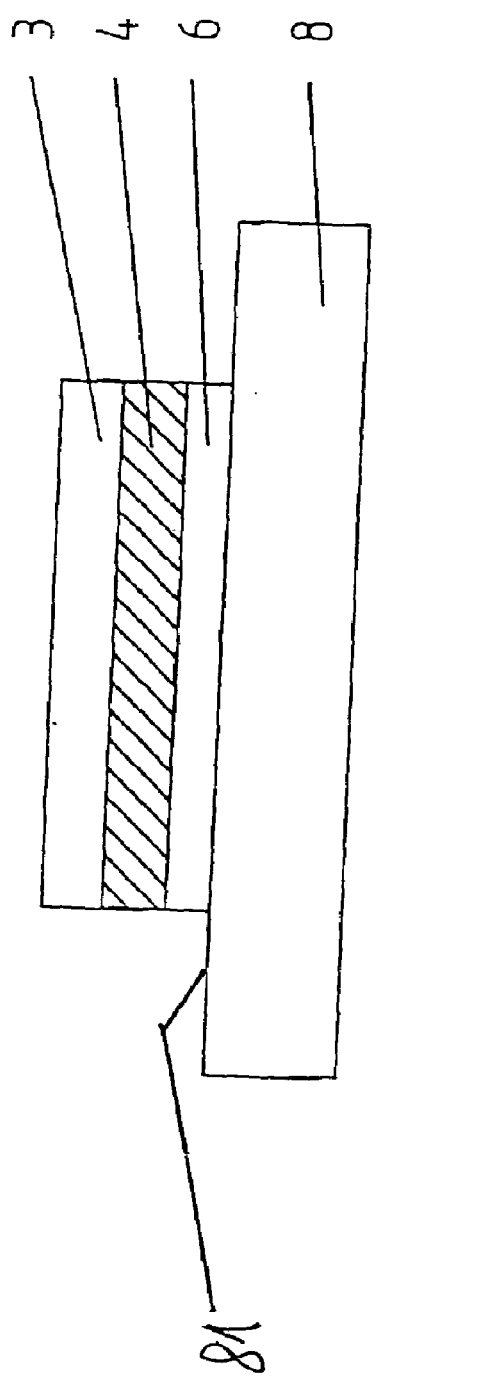

In the embodiment in FIGS. 11a and 11b a transfer film as shown in FIG. 1a is applied to a substrate 8 comprising paper material. As can be seen from the sectional view in FIG. 11b the multi-layer body comprises the protective layer 3, the laser-sensitive layer 4, the adhesive layer 6 and the substrate 8, a special identification 81 being present on the surface of the substrate 8. That identification 81 can be a separate layer applied to the substrate 8. As can be seen from the plan view in FIG. 11a the identification 81 comprises various identification elements, more specifically a security print 81d which can be in the form of guilloche patterns which are printed on, and fluorescent threads 81f which preferably only fluoresce under UV light and which in daylight can be seen as black threads. A watermark 81w is also provided in the substrate 8, as well as a security strip 81s. The security strip 81s can involve a body in the form of a strip or thread, which can have a diffraction and/or hologram structure and additional security features such as also for example laser-induced markings and so forth. A laser-induced image 10y is produced in the laser-sensitive layer, as can be seen from FIG. 11a. That laser-induced image 10y can be produced in the form of a full-color image by way of the above-described bleaching process. The laser-induced image 10y is provided only in a portion, which is rectangular in plan, of the surface of the card body 8. Preferably the entire transfer film can be applied with the laser-sensitive layer 4 exclusively in that region of the card body 8. As can be seen from FIG. 11a the rectangular region of the laser-induced image 10y is transparent, that is to say the entire region of the laser-sensitive layer is bleached by way of the laser treatment in such a way that the colored image components are transparent with color shading and the region around the color markings is completely transparently bleached. That affords the advantage that the identification 81 on and in the card body 8 appears visibly through the laser-induced image 10y. That affords a particularly high level of safeguard in respect of forgery.

Figure 12A:
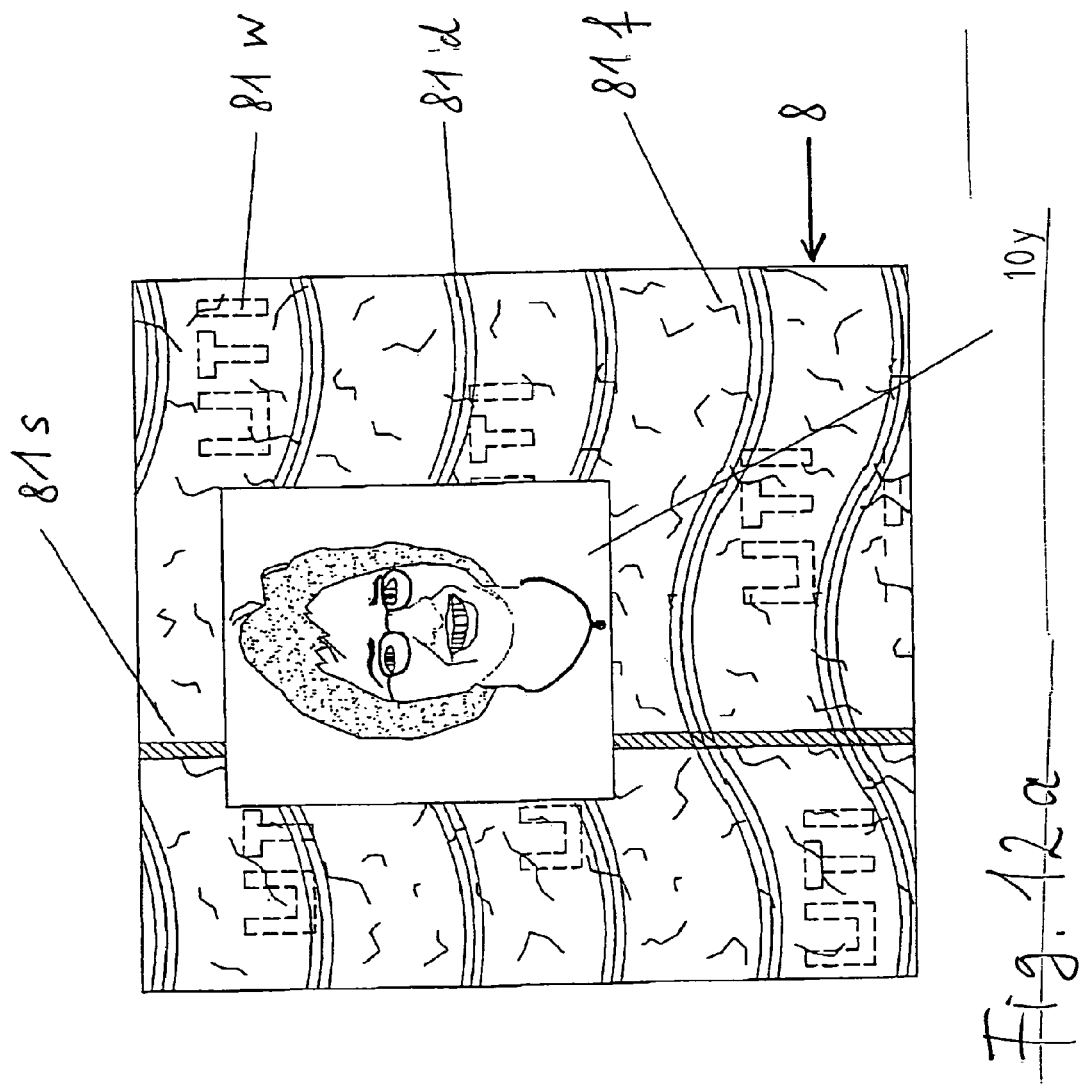

In the modified embodiment in FIGS. 12a and 12b, a transfer film with a layer structure as shown in FIG. 1 is used, unlike the embodiment in FIGS. 11a and 11b. Therefore, in addition to the layers 3, 4, 6, it has a background layer 5 between the laser-sensitive layer 4 and the adhesive layer 6. That background layer 5 is a layer which reflects the laser radiation used in production of the laser-induced image 10y and which does not pass through and absorbs the non-reflected component of the laser radiation. That special background layer provides that the identification 81 under the laser-induced image 10y is optically covered, that is to say for example with light in the visible spectral range it is no longer perceptible from the outside. By virtue of reflection of the light and possibly brightener substances additionally present in the background layer 5 the background layer 5 can provide for color boosting and/or brightening of the laser-induced color image 10y. In addition the background layer 5 provides that, with the action of the laser for producing the laser-induced image 10y, the subjacent layers, that is to say in particular also the substrate 8, is not damaged by laser irradiation or any other unwanted changes in the layers or in the substrate due to laser radiation do not occur.

Figure 13:
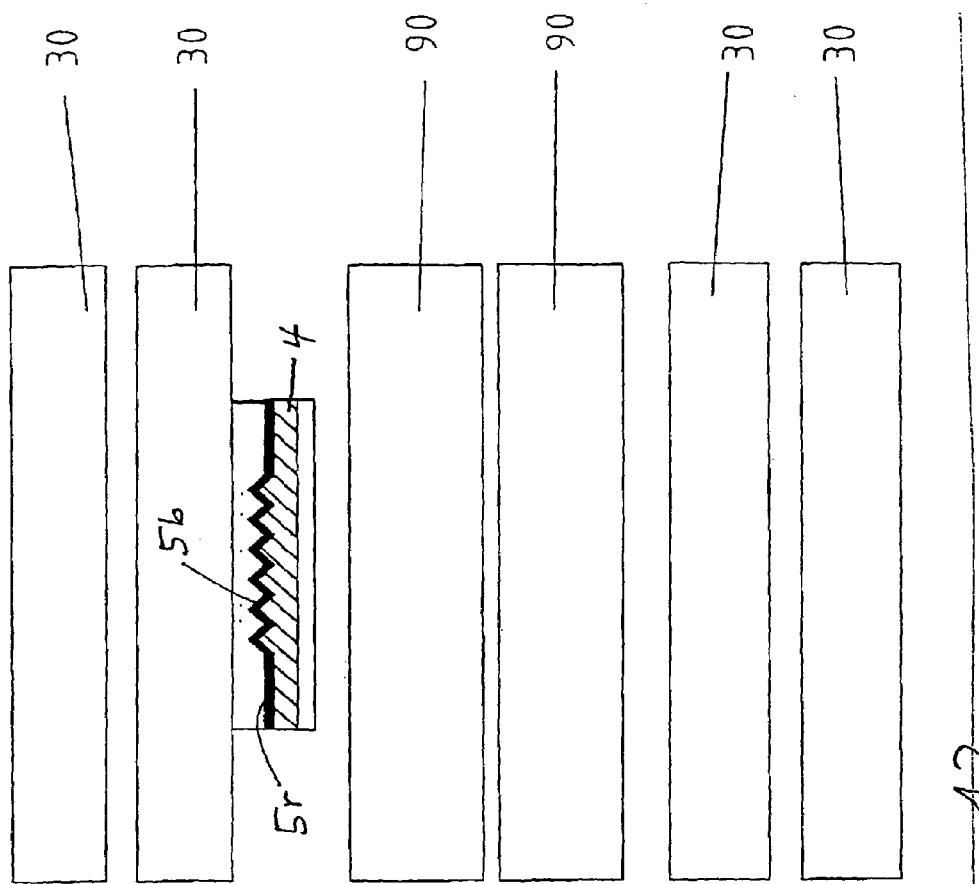

FIGS. 13 through 15 show various multi-layer bodies formed by lamination of various overlay films 30 and inlets 90 comprising paper material. All these embodiments have at least one laser-sensitive layer 4. It is respectively arranged in a laminating film which in regard to its structure substantially corresponds to the films which are shown in FIGS. 10, 10a and 10b and which involve laminating films produced by applying a transfer film to an overlay film. In addition, the embodiments in FIGS. 14 and 15 have a further laser-sensitive layer in the form of an overlay film 32 doped with carbon and/or carbon black. The film 32 is arranged beneath the overlay film 30 provided with the transfer film. In the embodiment in FIG. 15 a background layer 5 is provided between the laser-sensitive layer 4 and the doped overlay film 32. The background layer 5 is comparable in respect of its configuration and function with the background layer 5 of the embodiment of FIGS. 12a and 12b.

The invention claimed is:

1. A multi-layer body comprising a substrate and a single-layer or multi-layer structure based on a transfer film having an adhesive layer or based on a laminating film having an adhesive layer, wherein the layer structure comprises at least one laser-sensitive layer containing a laser-sensitive material, wherein the laser-sensitive material comprises at least one coloring agent which is bleachable by the action of laser, wherein the at least one bleachable coloring agent is in the form of a pigment, and the laser-sensitive material is such that a color marking or a black marking can be produced within the at least one laser-sensitive layer by the action of laser in the at least one laser-sensitive layer, wherein the substrate comprises a paper material and the at least one laser-sensitive layer is applied as part of the transfer film or the laminating film to the substrate, wherein the adhesive layer forms an adhesive bond to the substrate.

2. A multi-layer body as set forth in claim 1, wherein the laser-sensitive material further comprises material which is blackenable under the action of laser, preferably blackenable in gray scales, in particular in the form of carbon-doped and/or carbon black-doped material.

3. A multi-layer body as set forth in claim 1, wherein the laser-sensitive material further comprises at least one coloring agent which changes its color by the action of laser with a color change.

4. A multi-layer body as set forth in claim 1, wherein the laser-sensitive material is in the form of a coloring agent mixture composed of a plurality of different coloring agent components, wherein it applies in respect to at least two of the components that, under the laser conditions which are specific to the one component, the other component is not or is substantially not changed.

5. A multi-layer body as set forth in claim 4, wherein the coloring agent mixture is composed of at least three different coloring agent components, wherein each of the three coloring agent components is in the form of a pigment or at least one of the three coloring agent components is in the form of a pigment and at least one of the three coloring agent components is in the form of another coloring agent and the coloring agent mixture is bleachable by means of laser under laser conditions which are specific to the respective component, wherein it applies in respect to each of the three components that, under the laser conditions which are specific to a component, the other components are not or are substantially not bleachable.

6. A body as set forth in claim 4, wherein the laser conditions which are specific to the various components are different preferably in respect to the laser wavelength and, under the laser conditions which are specific to the respective component, the other components are not or are substantially not bleachable.

7. A body as set forth in claim 4, wherein at a location of the at least one laser-sensitive layer preferably at least in a region-wise manner at each location of the at least one laser-sensitive layer a plurality of different components of the coloring agent mixture and preferably all various components of the coloring agent mixture are arranged mixed and the color at that location is formed by preferably subtractive color mixing.

8. A body as set forth in claim 5, wherein the component absorbs light at the laser light wavelength used for the bleaching operation insofar as at that wavelength the component has an absorption maximum, preferably one of a plurality of absorption maxima or preferably its sole or its greatest absorption maximum.

9. A body as set forth in claim 5, wherein the component absorbs light at the laser light wavelength used for the bleaching operation, but the component at that wavelength does not have an absorption maximum but said wavelength is outside the absorption maximum or outside the absorption maxima of the component.

10. A body as set forth in claim 4, wherein the coloring agent mixture has only three coloring agent components or more than three coloring agent components.

11. A body as set forth in claim 4, wherein a component is a cyan coloring agent, preferably cyan pigment, and/or that a component is a magenta coloring agent, preferably magenta pigment, and/or that a component is a yellow coloring agent, preferably yellow pigment.

12. A body as set forth in claim 11, wherein the cyan coloring agent is in the form of a coloring agent which is bleachable exclusively or preferably with red laser light and/or the magenta coloring agent is in the form of a coloring agent which is bleachable exclusively or preferably with green laser light and/or the yellow coloring agent is in the form of a coloring agent which is bleachable exclusively or preferably with blue laser light.

13. A multi-layer body as set forth in claim 1, wherein provided between the at least one laser-sensitive layer and the substrate is a background layer which is preferably reflecting to a high degree for the laser radiation which acts upon laser irradiation of the laser-sensitive material and/or is in particular non-transparent or substantially non-transparent and/or absorbent for the non-reflected component of the laser radiation.

14. A multi-layer body as set forth in claim 13, wherein the background layer is transparent for light in the visible spectral range and/or transparent or non-transparent for laser irradiation of only given laser conditions, in particular only given laser wavelengths, and is preferably transparent or non-transparent for the laser radiation which is used to produce a laser-induced marking in the at least one laser-sensitive layer.

15. A multi-layer body as set forth in claim 13, wherein the background layer is arranged exclusively in a region under the at least one laser-sensitive layer, preferably under the region in which the arrangement of a laser-induced marking is provided.

16. A process for the production of a laser-induced marking on or in a multi-layer body, the multi-layer body comprising a substrate and a single-layer or multi-layer structure based on a transfer film having an adhesive layer or based on a laminating film having an adhesive layer, wherein the adhesive layer forms an adhesive bond to the substrate, wherein the layer structure comprises at least one laser-sensitive layer containing a laser-sensitive material, wherein the laser-sensitive material comprises at least one coloring agent which is bleachable by the action of laser, at least one bleachable coloring agent is in the form of a pigment, and the substrate comprises paper material, the process comprising irradiating the multi-layer body with laser radiation and producing a laser-induced marking by bleaching or by bleaching and at least one of a color change and a blackening of the laser-sensitive material in the at least one laser-sensitive layer by the action of the laser radiation.

17. A process as set forth in claim 16, wherein the at least one laser-sensitive layer includes a layer structure comprising laser-sensitive material with two or preferably three bleachable coloring agents, wherein in a first step by laser irradiation of a location of the at least one laser-sensitive layer under laser conditions which are specific to one of the two, preferably three coloring agents, only one coloring agent is bleached and that in a second step by laser irradiation of the same location of the at least one laser-sensitive layer under laser conditions which are specific to a further one of the two, preferably three coloring agents, only that further coloring agent is bleached.

18. A process as set forth in claim 17, the process comprising a third step, wherein in the third step by laser irradiation of the same location of the at least one laser-sensitive layer under laser conditions which are specific to another further one of the three coloring agents at the same location of the at least one laser-sensitive layer only said other further coloring agent is bleached.

19. A process as set forth in claim 17, the process comprising an n-th step, wherein in the n-th step by laser treatment of the same location of the at least one laser-sensitive layer under laser conditions which are specific to an n-th further coloring agent only said n-th coloring agent is bleached, wherein n is greater than 3.

20. A process as set forth in claim 17, wherein all coloring agents are bleached by the laser irradiations of said location of the at least one laser-sensitive layer.

21. A process as set forth in claim 16, wherein the degree of bleaching to be achieved is adjusted in the laser irradiation operation by control of the laser conditions, in particular the laser intensity and/or the pulse duration and/or the irradiation time.

22. A process as set forth in claim 16, wherein at least one of the coloring agents has a color change in the laser irradiation operation.

23. A process a set forth in claim 16, wherein the at least one laser-sensitive layer is laser-irradiated successively at a plurality of locations.

24. A process a set forth in claim 16, wherein at the one location of the at least one laser-sensitive layer a plurality of different coloring agents and preferably all different coloring agents are arranged mixed and the color of said location is formed by subtractive color mixing.

25. A process a set forth in claim 16, wherein a cyan coloring agent, preferably cyan pigment, and/or a magenta coloring agent, preferably magenta pigment, and/or a yellow coloring agent, preferably yellow pigment, is used as the coloring agent.

26. A process a set forth in claim 25, wherein red laser light is used for bleaching the cyan coloring agent and/or green laser light is used for bleaching the magenta coloring agent and/or blue laser light is used for bleaching the yellow coloring agent.

27. A process as set forth in claim 25, wherein the color blue is formed by superimposition, preferably subtractive mixing of the colors cyan and magenta, preferably from the coloring agent mixture with cyan coloring agent, magenta coloring agent and yellow coloring agent by bleaching of the yellow coloring agent;

and/or the color green is formed by superimposition, preferably subtractive mixing of the colors cyan and yellow, preferably from the coloring agent mixture with cyan coloring agent, magenta coloring agent and yellow coloring agent by bleaching of the magenta coloring agent;

and/or the color red is formed by superimposition, preferably subtractive mixing of the colors yellow and magenta, preferably from the coloring agent mixture with magenta coloring agent, yellow coloring agent and cyan coloring agent by bleaching of the cyan coloring agent;

and/or black or gray is formed by superimposition, preferably subtractive mixing of the colors cyan, magenta and yellow, preferably from the coloring agent mixture with magenta coloring agent, yellow coloring agent and cyan coloring agent;

and/or the color magenta is formed by the magenta coloring agent by bleaching of the coloring agents present in the coloring agent mixture apart from the magenta coloring agent, preferably from the coloring agent mixture including magenta coloring agent, yellow coloring agent and cyan coloring agent, by bleaching of the yellow coloring agent and the cyan coloring agent;
and/or
the color cyan is formed by the cyan coloring agent by bleaching of the other coloring agents present in the coloring agent mixture apart from the cyan coloring agent, preferably from the coloring agent mixture including cyan coloring agent, yellow coloring agent and magenta coloring agent, by bleaching of the magenta coloring agent and the yellow coloring agent;
and/or
the color yellow is formed by the yellow coloring agent by bleaching of all coloring agents present in the coloring agent mixture apart from the yellow coloring agent, preferably from the coloring agent mixture including yellow coloring agent, magenta coloring agent and cyan coloring agent, by bleaching of the magenta coloring agent and the cyan coloring agent.

\* \* \* \* \*